July 20, 1954      J. MONAHAN      2,684,091
SCREW DRIVER
Filed March 6, 1953
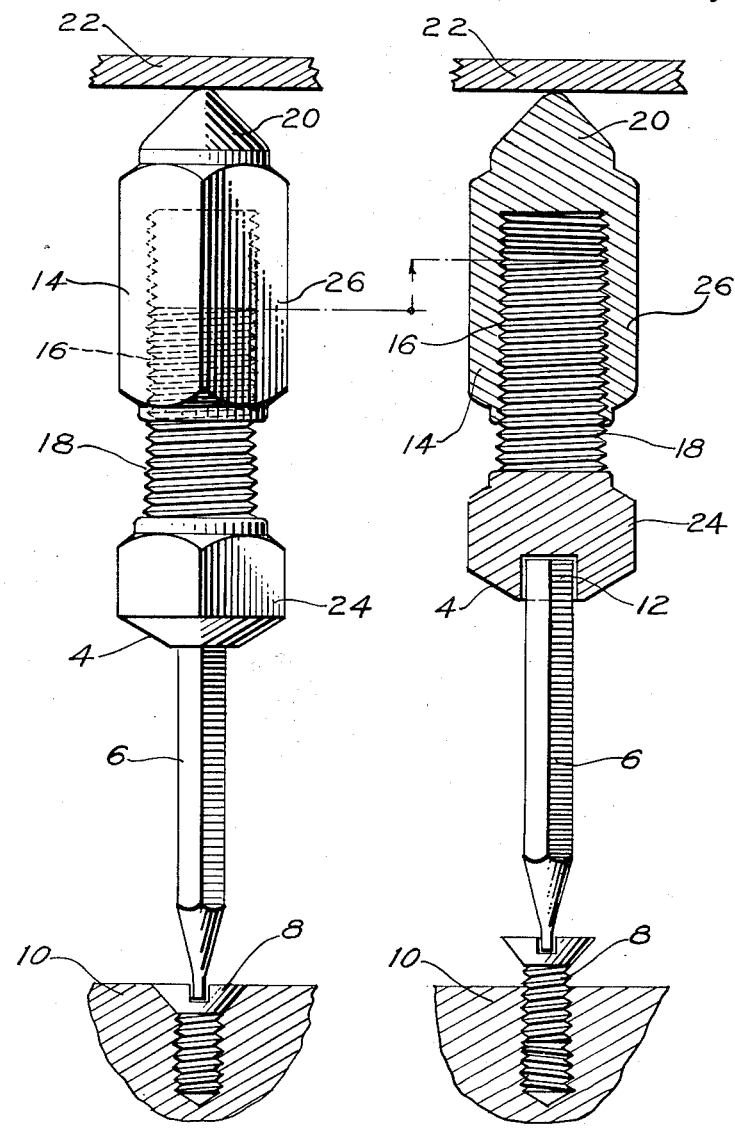
INVENTOR
JAMES MONAHAN
BY George Sipkin
Paul U. Critchlow Jr.
ATTORNEYS Patented July 20, 1954

2,684,091

UNITED STATES PATENT OFFICE 2,684,091

SCREW DRIVER

James Monahan, Vallejo, Calif.

Application March 6, 1953, Serial No. 340,938

2 Claims. (Cl. 144—32)

(Granted under Title 35, U. S. Code (1952), sec. 266)

This invention may be manufactured and used by or for the Government of the United States of America for governmental purposes without the payment of any royalties thereon or therefor.

This invention relates to screw drivers and, more particularly, to a screw driver for use with a fixed backing member.

In the turning of screws by conventional screw drivers, especially during final tightening or initial loosening operations, resistance to the applied force may cause the screw driver blade to slip out of the slot in the screw head and, in so doing, damage the surface in which the screw is positioned, or damage the slot so that the screw head is no longer useable. Although other types of screw drivers have been devised to enable the operator to apply an increased pressure to maintain screw engagement, in most of these instances, the pressure has been applied by complicated lever systems in which the motion of the levers were in a plane containing the axis of the screw to be driven. As can be readily appreciated, the use of such tools in a restricted work space was difficult, if not impossible. Further, the additional pressure alone afforded by these tools did not prevent the screw driver blade from moving axially relative to the screw and thus slipping out of the slot in the screw head.

Accordingly, a principal object of this invention is to provide a screw driver which the operator can easily and positively maintain the pressure required to keep the screw driver blade in engagement with screw head slot without the need for complicated lever systems.

Other objects will become apparent from the detailed description and the accompanying drawing.

The objects of this invention are achieved by a screw driver constructed to be positively engaged between a fixed backing member and a mounted screw, the screw driver being rotatable by the operator to tighten or remove the screw without slippage between the blade and the screw head. The screw driver comprises a body having at one end a blade, and a base connected to the body and having one end formed for abutting the backing member. The base is provided with means for applying a pressure on the blade to maintain a positive engagement of the blade with the screw head slot. The body is provided with means for rotating the blade while under such pressure to drive the screw, and for causing the blade to have an axial movement corresponding to the axial movement of the screw. In the preferred embodiment, this axial movement is achieved by threadedly connecting the body with the base, the threads of the connection having substantially the same pitch as the thread of the screw.

In the drawing, Fig. 1 is an elevation of the screw driver mounted between a fixed backing member and a screw to be loosened, and Fig. 2 is a longitudinal section of Fig. 1 after the screw has been loosened.

As shown in the drawing, the screw driver comprises a body 4 having a screw driver blade 6 adapted to engage a screw 8 in a member 10. The blade can be made as a permanent part of the body or, as illustrated, it can be one of the various detachable blades insertable in a socket 12 in the body. For applying pressure on blade 6 to maintain it in engagement with screw 8, a base 14 is threadedly engaged at 16 with a stud 18 formed on body 4 and the base has its end portion 20 shaped as a cone adapted to abut a fixed backing member 22. For reasons hereinafter explained, the threads at 16 are of substantially the same pitch as the thread of screw 8. As presently contemplated, the body and the blade will be rotatably driven by a simple turning tool, such as a wrench, and, for this purpose, the periphery of the body is formed with polygonal surfaces 24 adapted to receive the wrench. Similar polygonal surfaces 26 also are provided for facilitating rotation of base 14.

The drawing shows the screw driver being used to loosen a screw which is tightly "frozen" in position, but the device can be equally well used for tightening screws where there is a likelihood of an ordinary screw driver slipping out of the screw head slot. In operation, a suitable blade is inserted into socket 12 of body 4 and the blade is positioned in the slot of screw 8. With a wrench applied to surfaces 24 of body 4, the blade is held against rotation, while base 14 is engaged and turned by another wrench to unscrew stud 18. This section applies a positive axial pressure on the blade to maintain its engagement with the screw. To loosen the screw, base 14 then is held against rotation by its wrench, while the body 4 and the blade is turned by its wrench in such a direction as to be screwed into the base. Since the pitch of the threads at 16 is substantially the same as the thread of screw 8, the blade and screw are compelled to undergo the same amount of axial movement while being urged into tight inter-engagement under the positive pressure exerted by the device. Thus, the screw driver blade is positively prevented from slipping out of the screw head slot avoiding damage to the screw.

While it is preferred that the pitch of the threads at 16 be the same as that of the thread of screw 8 to be driven, it is apparent that the screw driver can be used to initially break loose "frozen" screws when the pitch of the threads at 16 is greater than that of the screw. In such instance, if the screw must be turned a considerable amount before it is loosened, the base may have to be periodically turned in order to maintain the required pressure to keep the screw driver blade engaged with the screw head slot.

Obviously, many modifications and variations of the present invention are possible in the light of the above teachings. It is, therefore, to be understood that within the scope of the appended claims the invention may be practiced otherwise than as specifically described.

I claim:

1. A screw driver for use with a fixed backing member comprising a body having at one end a screw driver blade for engagement with the head of a screw to be driven and having at the other end a threaded portion coaxial with the blade, a base having at one end a threaded portion adapted to interengage with the threaded portion of the body, the other end of said base being adapted to abut the backing member, the pitch of the threads of said threaded portions being substantially the same as the thread on the screw, and means for receiving a turning tool for rotating the blade.

2. A set of screw drivers for use with a fixed backing member, said set including a plurality of screw driver members each of which comprises a body provided at one of its ends with a screw driver blade for engagement with the head of a screw to be driven and at its other end with a threaded portion coaxial with the blade, and a base provided at one of its ends with a threaded portion adapted to interengage said threaded portion of the body and formed at its other end to abut said backing member, each of said set of members further being formed with the pitch of said threadedly engaged portions varying one from another and corresponding substantially with the pitch of one member of a series of screws having progressively increasing pitch members.

References Cited in the file of this patent

UNITED STATES PATENTS

| Number | Name | Date |
|---|---|---|
| 1,265,630 | Donohue | May 7, 1918 |
| 2,610,659 | Shaker | Sept. 16, 1952 |
| 2,623,556 | Henry | Dec. 30, 1952 |